(12) United States Patent
Okuzawa et al.

(10) Patent No.: US 7,001,480 B1
(45) Date of Patent: Feb. 21, 2006

(54) SYNTHETIC CHLOROPRENE RUBBER ADHESIVE COMPOSITION AND PROCESS FOR PRODUCING SPEAKER BY USING THE SAME

(75) Inventors: Kazurou Okuzawa, Tsu (JP); Yoshio Baba, Misato (JP); Kazutami Wakabayashi, Urawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/380,812

(22) PCT Filed: Jan. 8, 1999

(86) PCT No.: PCT/JP99/00045

§ 371 (c)(1),
(2), (4) Date: Nov. 23, 1999

(87) PCT Pub. No.: WO99/35204

PCT Pub. Date: Jul. 15, 1999

(30) Foreign Application Priority Data

Jan. 9, 1998 (JP) .................................. 10-013517

(51) Int. Cl.
*C09J 113/00* (2006.01)
(52) U.S. Cl. ..................................... 156/333; 525/215
(58) Field of Classification Search ................ 156/326, 156/332, 333; 525/215
See application file for complete search history.

(56) References Cited

U.S. PATENT DOCUMENTS

| 2,465,556 | A | * | 5/1949 | MacDonald et al. | ........ 525/215 |
| 3,347,837 | A | * | 10/1967 | Smith | .......................... 525/369 |
| 3,351,677 | A | * | 11/1967 | Barton et al. | ................ 525/215 |
| 4,235,980 | A | * | 11/1980 | Bateman | ...................... 525/215 |
| 4,737,528 | A | * | 4/1988 | Musch et al. | ................ 525/215 |
| 4,758,628 | A | * | 7/1988 | Wolfe | .......................... 525/215 |
| 5,205,897 | A | * | 4/1993 | Nonaka | ...................... 156/315 |
| 5,753,727 | A | * | 5/1998 | Sato et al. | ................... 523/438 |

FOREIGN PATENT DOCUMENTS

| JP | 54-113690 | 9/1979 |
| JP | 3-97399 | 4/1991 |
| JP | 06-306341 A | * 11/1999 |

OTHER PUBLICATIONS

Kirk-Othmer Encyclopedia of Chemical Technology, article entitled "Polychloroprene", sections 3.4 and 8.2, 1993.*
*Patents Abstracts of Japan*, (1989), Abstract of Japanese Published Application 01-153781 published Jun. 15, 1989.

* cited by examiner

*Primary Examiner*—Geoffrey L. Knable
(74) *Attorney, Agent, or Firm*—Wenderoth, Lind & Ponack, L.L.P.

(57) ABSTRACT

A synthetic chloroprene rubber adhesive composition which contains carboxylated synthetic chloroprene rubber for the main ingredient thereof and further contains chlorinated polypropylene and/or a chlorinated polypropylene derivatives. The adhesive composition can strongly bond various components to polypropylene used for a speaker frame, etc. unlike conventional synthetic chloroprene rubber adhesives which have insufficient adhesion strength in this application.

2 Claims, 1 Drawing Sheet

SYNTHETIC CHLOROPRENE RUBBER ADHESIVE COMPOSITION AND PROCESS FOR PRODUCING SPEAKER BY USING THE SAME

FIELD OF THE INVENTION

The present invention relates to a synthetic chloroprene rubber adhesive composition, and, more particularly, the invention relates to a synthetic chloroprene rubber adhesive composition for bonding components, at least one of which is formed with polypropylene, and a process for producing a speaker by using the adhesive composition.

BACKGROUND OF THE INVENTION

Conventionally, a chrome plated steel plate is used for a speaker frame, and various speaker components are bonded to the speaker frame by using an adhesive.

A vibration plate (hereinafter referred to as a cone) is bonded to the speaker frame via an edge.

When the edge is formed with a compression molded foamed urethane or an ethylene-vinyl-acetate-copolymer to increase mechanical strength, a water base synthetic chloroprene rubber adhesive or a water base SBR (styrene-butadiene-copolymer-rubber) adhesive are used for bonding the edge to the frame because those edge materials are soluble or swelled in a solvent based adhesive.

On the other hand, when the edge is formed with a kind of rubber such as natural SBR, EPDM (ethylene-propylene-diene-rubber) or the like, a solvent base synthetic chloroprene rubber adhesive, a water base synthetic chloroprene rubber adhesive, a solvent base SBR adhesive or a water base SBR adhesive is used.

In general, the adhesive is selected taking adhesion, influence on the materials, cost and production efficiency into account.

When the cone is directly bonded to the speaker frame the adhesive is selected in the same manner as described above in general.

When a damper is bonded to the speaker frame, a solvent base synthetic chloroprene rubber adhesive is generally used because the damper is formed with phenol-resin-impregnated cloth.

For bonding a top plate to the speaker frame, a solvent base synthetic chloroprene rubber adhesive is generally used because the top plate is formed with a metal plate.

In recent years, however, from the viewpoint of recycling for the protection of environment and for decreasing the weight of a speaker, polypropylene has come to be used for the speaker frame. In this case, the conventional adhesives described above have not sufficient adhesion to the polypropylene speaker frame, i.e., the conventional adhesives have not sufficient bonding strength for producing a speaker having a polypropylene frame.

The present invention aims to provide a synthetic chloroprene rubber adhesive composition that is superior in bonding various components to the components formed with polypropylene as described above, also aims to provide a process for producing a speaker by using the adhesive composition.

SUMMARY OF THE INVENTION

The present invention is to provide a synthetic chloroprene rubber adhesive composition which contains carboxylated synthetic chloroprene rubber for the main ingredient thereof and further contains chlorinated polypropylene and/or chlorinated polypropylene derivatives.

The above adhesive composition shows improvement in adhesion and durability against heat compared with conventional adhesives in bonding various components to polypropylene, which is resulted from the synergistic effect of carboxylated synthetic chloroprene rubber selected from the varieties of synthetic chloroprene rubber and a kind of chlorinated polypropylene, i.e., chlorinated polypropylene and/or the derivative thereof, which are(is) used for the additive(s) of the adhesive composition.

DESCRIPTION OF THE PREFERRED EMBODIMENTS

Figure 1:
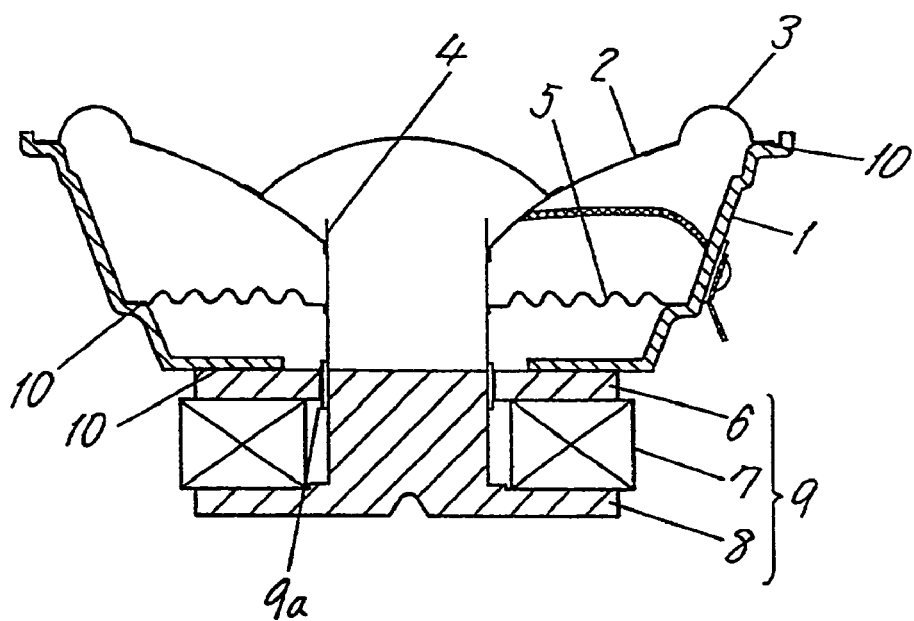
FIG. 1 shows a cross sectional view of a speaker the present invention.

The following are descriptions of a synthetic chloroprene rubber adhesive composition in the present invention and a process for producing a speaker using the same.

First, the structure of the speaker, which is described in the background of the invention, is described hereinafter in more detail, referring to FIG. 1.

A cone 2 which is formed with resin impregnated natural pulp or the like is bonded to a speaker frame 1 which is formed by molding polypropylene, via an edge 3 which is formed with compression molded foamed urethane or an ethylene-vinyl-acetate-copolymer to increase mechanical strength. The edge 3 is formed with a kind of rubber such as natural SBR, EPDM or the like also. The inner annular end of the cone 2 is bonded to a voice coil 4.

The outer annular end of a damper 5 which is formed with resin impregnated cloth is bonded to the speaker frame 1, and, the inner annular end of the damper 5 is bonded to the voice coil 4.

A ring-shaped top plate 6 which is bonded to the bottom of the speaker frame 1, a ring-shaped magnet 7 and a bottom plate 8 having a center pole compose a magnetic circuit 9. In a gap between the center pole of the bottom plate 8 and the top plate 6, a magnetic gap 9a is formed. The coiled portion of the voice coil 4 is movably inserted into the gap.

An adhesive 10, which is a synthetic chloroprene rubber adhesive composition containing carboxylated synthetic chloroprene rubber for the main ingredient thereof and further containing chlorinated polypropylene, is applied between the speaker frame 1 and the other speaker component parts such as the edge 3, the damper 5, the top plate 6, etc. respectively for tenaciously bonding between the speaker frame 1 formed with polypropylene and the other speaker components.

In a speaker in which the edge 3 is not used, the adhesive 10 is applied between the cone 2 and the speaker frame 1 for bonding between these.

Next, a synthetic chloroprene rubber adhesive composition, which is used for bonding various speaker components to the speaker frame formed with polypropylene, is described hereinafter referring to Table 1.

In Table 1, test examples 2 through 4 show adhesive compositions in the exemplary embodiment of the present invention, and test example 1 shows an adhesive composition in a conventional synthetic chloroprene rubber adhesive.

TABLE 1

(PHR)

| Ingredient | Test example 1 | Test example 2 | Test example 3 | Test example 4 |
|---|---|---|---|---|
| Neoprene AD (synthetic chloroprene rubber used as adhesive in general) | 100 | | | |
| Neoprene AF (carboxylated synthetic chloroprene rubber) | | 100 | 100 | 100 |
| BHT (antioxidant) | 2 | 2 | 2 | 2 |
| Zinc oxide | 5 | 5 | 5 | 5 |
| Magnesium oxide | 8 | 8 | 8 | 8 |
| tert-Butylphenol resin | 60 | 60 | 60 | 60 |
| Terpene-phenol resin | 10 | 10 | 10 | 10 |
| Chlorinated polypropylene | 20 | 20 | | 10 |
| Hydroxyethyl-acrylate-grafted chlorinated polypropylene | | | 20 | 20 |
| Organic solvent composed of toluene (4), ethyl acetate (3) and normal hexane (3) | 465 | 465 | 465 | 455 |

The adhesive compositions of the test examples in Table 1 are prepared in such a manner that the necessary volume of the organic solvent is poured into a vessel, then tert-butylphenol resin and terpene-phenol resin are put into the same vessel and these are dissolved under room temperature. In the other process, synthetic chloroprene rubber, antioxidant, zinc oxide and magnesium oxide are kneaded using a roll mill, then the kneaded lump is cut to small pieces, then these are put into the above vessel. Then, stirring is performed on the materials in the vessel for 8 to 10 hours under room temperature until all of these dissolve completely.

Then additive(s) such as chlorinated polypropylene and/or the like are/is put into the vessel, and the additive(s) are/is dissolved by stirring under the temperature of 20–40° C. Thus the adhesive compositions of Table 1 are obtained. The viscosity of the adhesive compositions is adjustable by changing the volume of the organic solvent.

Table 2 shows the test results of the adhesion strength of the adhesive compositions of the test examples 1 through 4 of Table 1 under the conditions of (a) after 48 hours under normal condition, (b) after heat aging and (c) under high temperature.

TABLE 2

(N/25 mm)

adhesion strength (180° peeling off)

| Test condition | 1 | 2 | 3 | 4 | Test method |
|---|---|---|---|---|---|
| Adhesion after 48 hours under normal condition | 25 | 35 | 42 | 39 | JIS K6854 |
| Adhesion after heat aging (70° C. × 96 hours) | 18 | 42 | 45 | 45 | JIS K6854 |
| Adhesion under high temperature (80° C.) | 20 | 30 | 35 | 32 | JIS K6854 |

The test pieces used in the test are a polypropylene plate and a polypropylene film, and, 150 grams per square meter of the respective adhesive compositions of Table 1 is applied by using a brush on the respective bonding surfaces. After keeping 15 minutes in the room of temperature 23° C. and humidity 60%, the two test pieces are put together and pressed by a hand roller for bonding between these.

The adhesive composition of the test example 1 of Table 2, in which the conventionally and generally used synthetic chloroprene rubber is used, shows the lowest adhesion comparing with the adhesive compositions of the other test examples in all test conditions of normal condition, heat aging and high temperature.

On the other hand, the test examples of 2 through 4 of Table 2, in which the carboxylated synthetic chloroprene rubber is used for the adhesive compositions, show higher values of adhesion strength in all test conditions of normal condition, heat aging and high temperature. The test example 3, in which only hydroxyethyl-acrylate-grafted chlorinated polypropylene is added to the additive, shows the highest adhesion strength in all of the test conditions.

Table 3 shows the basic composition of the synthetic chloroprene rubber adhesive composition of the present invention, which is obtained from the above test results.

TABLE 3

(PHR)

| | |
|---|---|
| Carboxylated synthetic chloroprene rubber | 100 |
| Antioxidant | 2 |
| Magnesium oxide | 8 |
| Zinc oxide | 5 |
| Reinforcing resin | 10–100 |
| Tackifier | 0–10 |
| Inorganic filler | 0–10 |
| Chlorinated polypropylene, or, Acrylic-monomer-and-methacrylic-monomer-grafted chlorinated polypropylene | 1–30 |
| Organic solvent | as required |

The above composition is an example and not limited thereto. For example, the volume of the antioxidant, magnesium oxide, zinc oxide and organic solvent can be adjusted according to necessity.

INDUSTRIAL APPLICABILITY

As described above, the synthetic chloroprene rubber adhesive composition of the present invention uses carboxylated synthetic chloroprene rubber selected from the varieties of synthetic chloroprene rubber, also uses a kind of chlorinated polypropylene, i.e., chlorinated polypropylene and/or the derivative thereof for the additive(s) of the adhesive composition, which creates a synergistic effect for increasing adhesion to the polypropylene and durability against heat. Further details of the effects are as follows:

(1) When the chlorinated polypropylene derivative is acrylic-monomer-and-methacrylic-monomer-grafted chlorinated polypropylene, and, when the volume of the chlorinated polypropylene and/or the chlorinated polypropylene derivative contained in the adhesive composition is adjusted to be 1–30 parts by weight per 100 parts in weight of carboxylated synthetic chloroprene rubber, an adhesive composition having a high temperature adhesion strength without loosing a good adhesion to the polypropylene, can be obtained.

(2) In a process for producing a speaker having a speaker frame formed with polypropylene, a process for producing a speaker which results in a good adhesion and superior durability against heat can be obtained. In which process, various speaker components are bonded to the speaker frame using the synthetic chloroprene rubber adhesive composition containing carboxylated synthetic chloroprene rubber for the main ingredient thereof and further containing chlorinated polypropylene and/or a chlorinated polypropylene derivative. The good adhesion and superior durability against heat is resulted by using carboxylated synthetic chloroprene rubber for the main ingredient and chlorinated polypropylene and/or a chlorinated polypropylene derivative for the additive(s) of the adhesive composition.

(3) When the chlorinated polypropylene derivative is acrylic-monomer-and-methacrylic-monomer-grafted chlorinated polypropylene and when the volume of the chlorinated polypropylene and/or the chlorinated polypropylene derivative contained in the adhesive composition is adjusted to be 1–30 parts by weight 100 parts in weight of carboxylated synthetic chloroprene rubber, a process for producing a speaker, in which various speaker components are more strongly bonded under high temperature to the speaker frame formed with polypropylene, can be obtained.

What is claimed is:

1. A synthetic chloroprene rubber adhesive composition for adhering speaker components to a polypropylene speaker frame, which composition consists essentially of, based upon 100 parts by weight of rubber (PHR):

100 parts by weight of carboxylated synthetic chloroprene rubber; and

1–30 parts by weight of chlorinated polypropylene and/or chlorinated polypropylene derivatives, wherein said chlorinated polypropylene derivative is acrylic-monomer-and-methacrylic-monomer-grafted chlorinated polypropylene.

2. A process for producing a speaker having a speaker frame formed by molding polypropylene, wherein speaker components are bonded to said speaker frame by using a synthetic chloroprene rubber adhesive composition, which composition consists essentially of, based upon 100 parts by weight of rubber (PHR):

100 parts by weight of carboxylated synthetic chloroprene rubber; and

1–30 parts by weight of chlorinated polypropylene and/or a chlorinated polypropylene derivative, wherein said chlorinated polypropylene derivative is acrylic-monomer-and-methacrylic-monomer-grafted chlorinated polypropylene.

* * * * *